US012216427B2

(12) United States Patent
Iijima et al.

(10) Patent No.: US 12,216,427 B2
(45) Date of Patent: *Feb. 4, 2025

(54) IMAGE FORMING APPARATUS HAVING A PAIR OF CHAINS WOUND AROUND A FIXING ROLLER AND A TRANSFER ROLLER

(71) Applicant: FUJIFILM Business Innovation Corp., Tokyo (JP)

(72) Inventors: Chihiro Iijima, Kanagawa (JP); Naohito Otsuki, Kanagawa (JP); Hiroyuki Suzuki, Kanagawa (JP); Yuta Chino, Kanagawa (JP); Takehiko Koizumi, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/583,574

(22) Filed: Jan. 25, 2022

(65) Prior Publication Data

US 2023/0066069 A1 Mar. 2, 2023

(30) Foreign Application Priority Data

Aug. 25, 2021 (JP) ................................ 2021-137630

(51) Int. Cl.
*G03G 15/00* (2006.01)
*B65H 5/08* (2006.01)
(Continued)

(52) U.S. Cl.
CPC ......... *G03G 15/6529* (2013.01); *B65H 5/085* (2013.01); *B65H 29/044* (2013.01);
(Continued)

(58) Field of Classification Search
None
See application file for complete search history.

(56) References Cited

U.S. PATENT DOCUMENTS 3,797,929 A 3/1974 Deacon et al.
4,935,778 A * 6/1990 Mochida ................ G03G 15/01 399/209
(Continued)

FOREIGN PATENT DOCUMENTS

EP 1 642 739 A2 4/2006
JP 2000-19798 A 1/2000
(Continued)

OTHER PUBLICATIONS

Extended European Search Report dated Aug. 31, 2022 in European Application No. 22166248.9.
(Continued)

*Primary Examiner* — Arlene Heredia
(74) *Attorney, Agent, or Firm* — Sughrue Mion, PLLC

(57) ABSTRACT

An image forming apparatus includes: a fixing cylinder, having a groove formed in an outer portion thereof in a rotational radial direction thereof; a delivery cylinder; plural holding members configured to hold a recording medium when it passes around the delivery cylinder toward the fixing cylinder, and arranged in a length direction of a circulating member, each holding member being disposed in the groove when the holding member passes along the outer portion of the fixing cylinder; and a pressure unit applying a pressure to the recording medium as it passes between the pressure unit and the fixing cylinder, the pressure unit coming into contact with an end portion of the groove in a rotation direction of the fixing cylinder before or after a period during a holding operation when one of the holding members holds the recording medium.

15 Claims, 5 Drawing Sheets

(51) Int. Cl.
*B65H 29/04* (2006.01)
*G03G 15/20* (2006.01)
*G03G 15/16* (2006.01)

(52) U.S. Cl.
CPC .................... *G03G 15/2028* (2013.01); *B65H 2301/44712* (2013.01); *G03G 15/1615* (2013.01)

(56) References Cited

U.S. PATENT DOCUMENTS

| | | | | |
|---|---|---|---|---|
| 2021/0294246 | A1 | 9/2021 | Yoshioka et al. | |
| 2021/0325805 | A1 | 10/2021 | Kodera et al. | |
| 2022/0113659 | A1 | 4/2022 | Miyagawa et al. | |
| 2022/0082967 | A1 | 5/2022 | Yamashita et al. | |
| 2023/0063389 | A1* | 3/2023 | Iijima | G03G 15/1685 |

FOREIGN PATENT DOCUMENTS

| | | | |
|---|---|---|---|
| JP | 2020-140062 | A | 9/2020 |
| JP | 2020-148962 | A | 9/2020 |
| WO | 2020/261614 | A1 | 12/2020 |
| WO | 2021/053890 | A1 | 3/2021 |
| WO | 2021/054292 | A1 | 3/2021 |

OTHER PUBLICATIONS

Communication dated Sep. 10, 2024 issued by the European Patent Office in application No. 22166248.9.

* cited by examiner 26A, 26
18
72
24
P1
P
20
27
V1
V1→V2
V2

IMAGE FORMING APPARATUS HAVING A PAIR OF CHAINS WOUND AROUND A FIXING ROLLER AND A TRANSFER ROLLER

CROSS-REFERENCE TO RELATED APPLICATIONS

This application is based on and claims priority under 35 USC 119 from Japanese Patent Application No. 2021-137630 filed Aug. 25, 2021.

BACKGROUND

(i) Technical Field

The present disclosure relates to an image forming apparatus.

(ii) Related Art

Japanese Unexamined Patent Application Publication No. 2020-140062 discloses an image forming apparatus. The image forming apparatus according to this documents includes a loop-shaped transfer belt having an outer surface to which an image is transferred, and a transfer unit including a transfer cylinder and rotating bodies. The transfer cylinder has a transfer area in which a recording medium is sandwiched between the transfer cylinder and the outer surface of the transfer belt to transfer the image from the transfer belt to the recording medium. The rotating bodies are disposed at both ends of the transfer cylinder in an axial direction. The image forming apparatus also includes circulating members wrapped around the rotating bodies and circulated by rotation of the rotating bodies, and a holding unit attached to the circulating members. The holding unit holds the recording medium so that the recording medium is transported by circulation of the circulating members and caused to pass through the transfer area.

SUMMARY

Aspects of non-limiting embodiments of the present disclosure relate to an image forming apparatus in which a recording medium can be held by a holding member with less reduction in accuracy compared to when vibration generated at a fixing cylinder is transmitted to the holding member when the holding member holds the recording medium.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an image forming apparatus including: a fixing cylinder that is rotatably supported, that has a groove formed in an outer portion thereof in a rotational radial direction thereof, and that causes an image transferred to a recording medium to be fixed to the recording medium when the recording medium passes along an outer surface of the fixing cylinder in the rotational radial direction; a delivery cylinder that is rotatably supported; a circulating member that is loop-shaped and wrapped at least around the fixing cylinder and the delivery cylinder; plural holding members configured to hold the recording medium when the recording medium passes around the delivery cylinder toward the fixing cylinder, the holding members being supported by the circulating member such that the holding members are arranged in a length direction of the circulating member with predetermined intervals therebetween, each holding member being disposed in the groove when the holding member passes along the outer portion of the fixing cylinder; and a pressure unit that is rotatably supported and that causes the recording medium to pass between the pressure unit and the fixing cylinder while a pressure is applied between the pressure unit and the fixing cylinder, the pressure unit coming into contact with an end portion of the groove in a rotation direction of the fixing cylinder before or after a period from when one of the holding members starts a holding operation for holding the recording medium to when the holding operation is completed.

BRIEF DESCRIPTION OF THE DRAWINGS

An exemplary embodiment of the present disclosure will be described in detail based on the following figures, wherein.

DETAILED DESCRIPTION

An exemplary embodiment of the present disclosure will now be described with reference to the drawings.

Image Forming Apparatus 10

Figure 1:
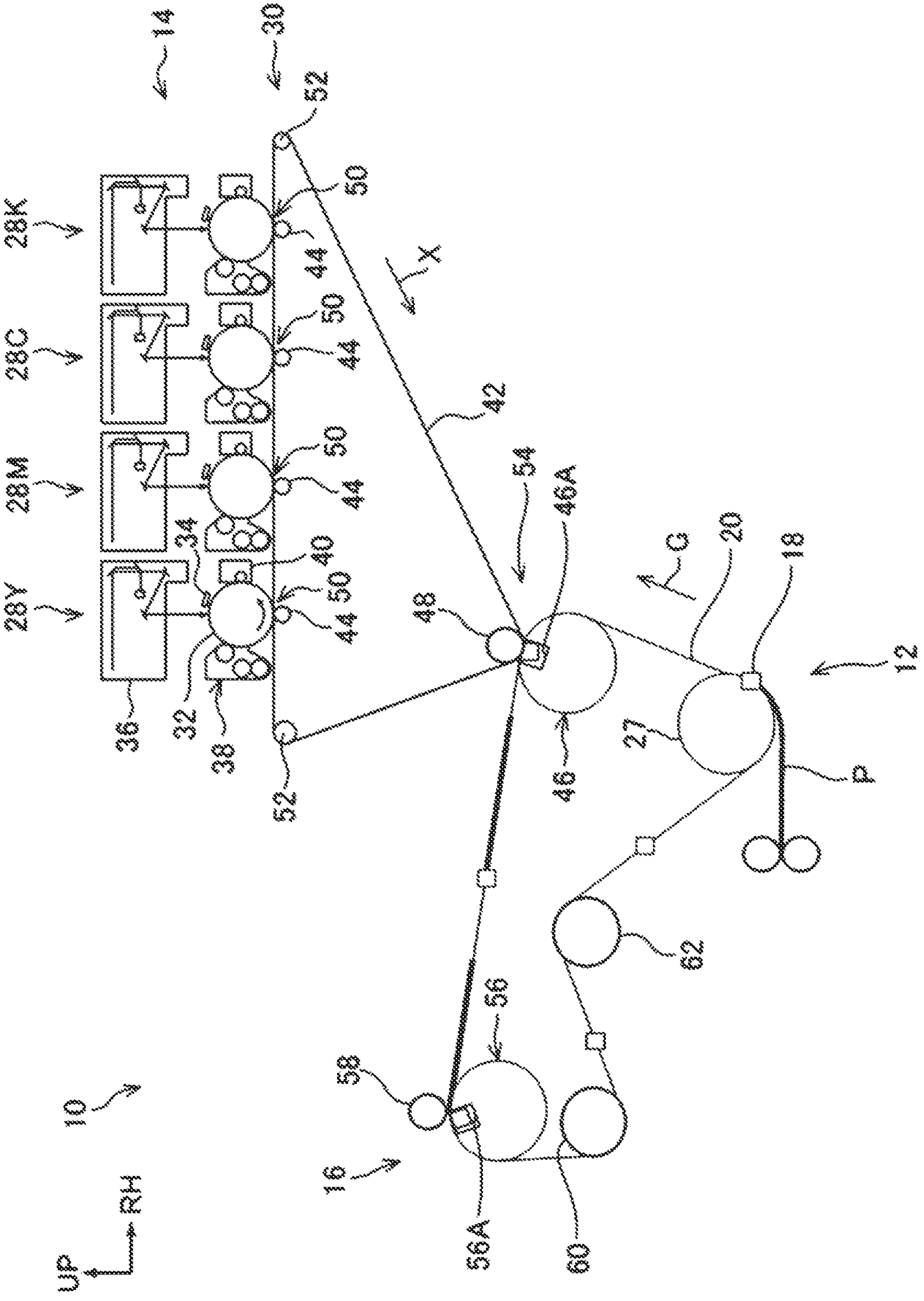
FIG. 1 is a schematic front view illustrating the structure of an image forming apparatus.

The structure of an image forming apparatus 10 will now be described. FIG. 1 is a schematic front view illustrating the structure of the image forming apparatus 10 according to the present exemplary embodiment. In each of the figures, arrow UP shows a vertically upward direction, which is an upward direction with respect the apparatus. Referring to FIG. 1, arrow RH shows a horizontal direction toward the right when viewed from a point facing the front of the apparatus. In the following description, the term "up-down direction" means the up-down direction with respect to the apparatus illustrated in FIG. 1 unless otherwise specifically stated. In addition, the term "left-right direction" means the left-right direction when viewed from a point facing the front of the apparatus illustrated in FIG. 1 unless otherwise specifically stated. In addition, the term "front-back direction" means the front-back direction when viewed from a point facing the front of the apparatus illustrated in FIG. 1 (in other words, near-far direction orthogonal to the plane of FIG. 1) unless otherwise specifically stated.

The image forming apparatus 10 is an electrophotographic image forming apparatus that forms toner images (example of an image) on paper sheets P (examples of a recording medium). More specifically, as illustrated in FIG. 1, the image forming apparatus 10 includes a transport unit 12, an image forming unit 14, and a fixing unit 16.

Transport Unit 12

Figure 2:
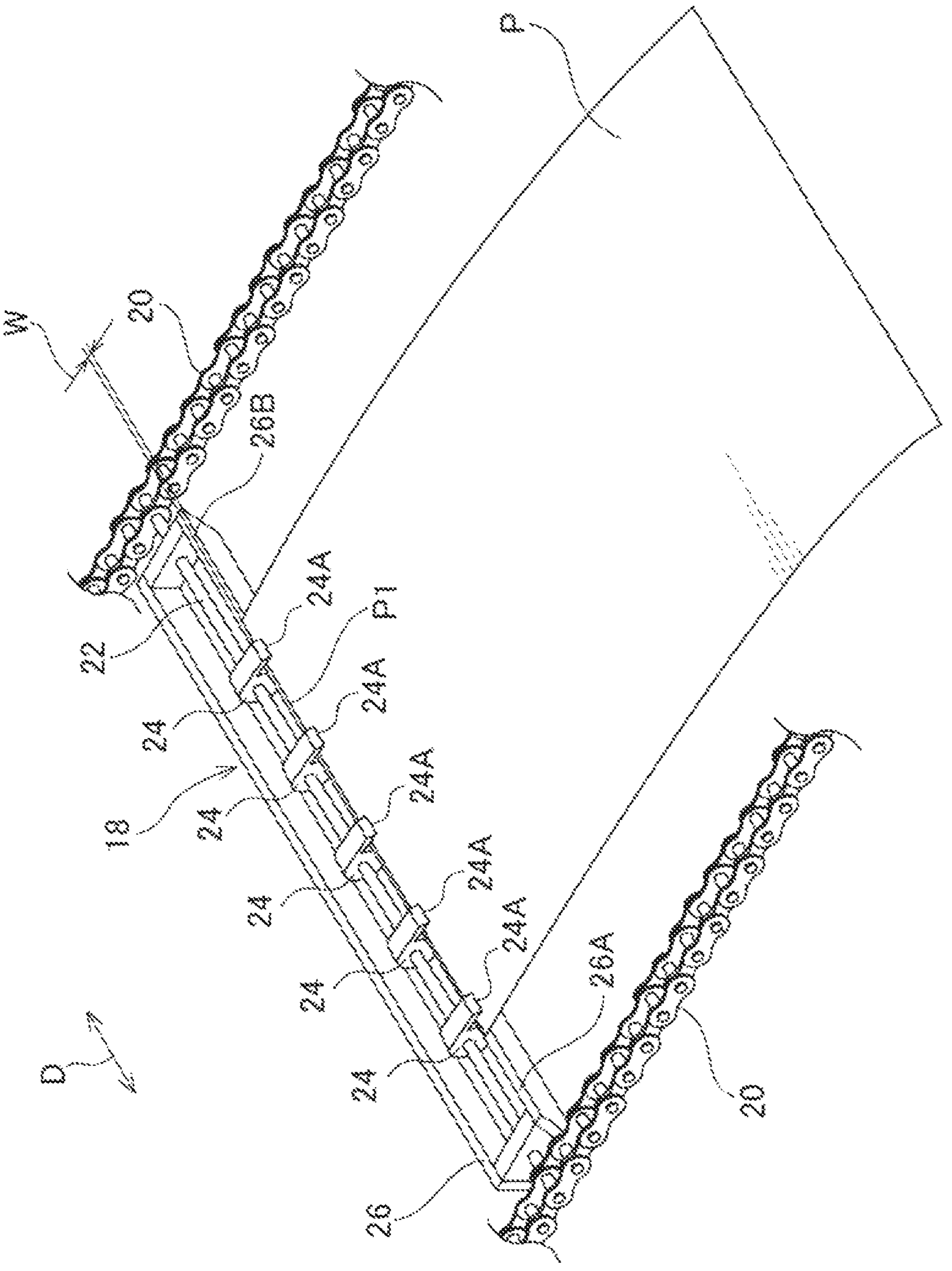
FIG. 2 is a perspective view of chains and a gripper.

The transport unit 12 has a function of transporting each paper sheet P. More specifically, as illustrated in FIGS. 1 and 2, the transport unit 12 includes grippers 18 and a pair of chains 20. The grippers 18 are examples of a holding member. The pair of chains 20 are examples of a circulating member, and are loop-shaped as illustrated in FIG. 1. As illustrated in FIG. 2, the pair of chains 20 are arranged in the front-back direction (direction D in FIG. 2) with an interval therebetween. FIG. 1 illustrates one of the pair of chains 20 that is disposed at the front. In FIG. 1, the chain 20 and the grippers 18 are simplified.

Each of the pair of chains 20 is arranged to extend around a delivery cylinder 27, a transfer cylinder 46, a fixing cylinder 56, a first intermediate shaft portion 60, and a second intermediate shaft portion 62 described below. More specifically, the pair of chains 20 are wrapped around pairs of sprockets (not illustrated) disposed at one and the other ends of each of the delivery cylinder 27, the transfer cylinder 46, the fixing cylinder 56, the first intermediate shaft portion 60, and the second intermediate shaft portion 62 described below in an axial direction. Accordingly, the delivery cylinder 27, the transfer cylinder 46, the fixing cylinder 56, the first intermediate shaft portion 60, and the second intermediate shaft portion 62 rotate in synchronization with each other.

As illustrated in FIG. 2, each gripper 18 includes a cylindrical shaft 22 that extends in the front-back direction, plural clips 24 that are arranged in the front-back direction with intervals therebetween and supported by the shaft 22, and a rectangular casing 26 that covers the clips 24. Both end portions of the shaft 22 in the front-back direction are supported by respective ones of the pair of chains 20. The casing 26 extends in the front-back direction, and is held by the shaft 22. The casing 26 is configured to rotate independently of rotation of the clips 24. In this structure, end portions 24A of the clips 24 and an end portion 26B of a fixed lug portion 26A of the casing 26 are capable of nipping a leading end portion P1 of the paper sheet P in a direction in which the paper sheet P is transported.

Referring to FIGS. 3A to 3F, in the transport unit 12, the gripper 18 holds the leading end portion P1 of the paper sheet P fed from a storage unit (not illustrated) when the gripper 18 passes an outer peripheral portion of the delivery cylinder 27, which is an outer portion of the delivery cylinder 27 in a rotational radial direction. The delivery cylinder 27 is supported rotatably about an axis extending in the front-back direction. The rotational radial direction is a direction orthogonal to the rotational axis of the delivery cylinder 27. The term "rotational radial direction" is also referred to in the following description in a similar meaning.

Figures 3A, 3B, 3C, 3D, 3E, 3F:
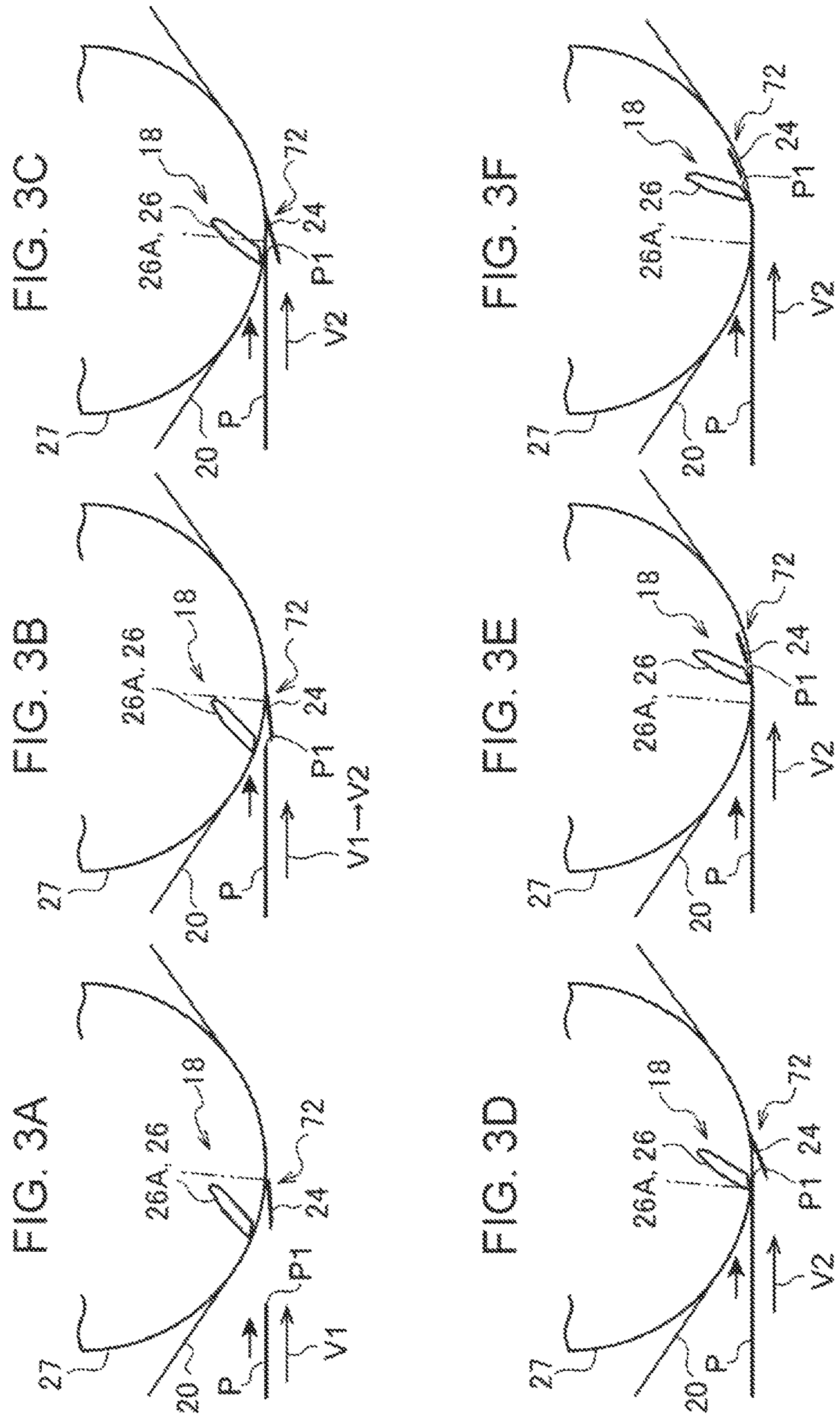
FIGS. 3A to 3F are schematic front views illustrating the manner in which a paper sheet is transported and the gripper is operated.

More specifically, as illustrated in FIG. 3A, the paper sheet P is fed from the storage unit (not illustrated) at a first transport speed V1. Next, as illustrated in FIGS. 3B and 3C, the paper sheet P fed from the storage unit at the first transport speed V1 is decelerated from the first transport speed V1 to a second transport speed V2. As illustrated in FIG. 3C, after the deceleration to the second transport speed V2 is completed, the leading end portion P1 of the paper sheet P enters a space between the end portion 26B of the fixed lug portion 26A of the casing 26 and the end portion 24A of each clip 24 at a delivery position 72.

Then, as illustrated in FIGS. 3D to 3F, the gripper 18 holds the leading end portion P1 of the paper sheet P and transports the paper sheet P. In other words, the gripper 18 receives and transports the paper sheet P.

Referring to FIG. 1, in the transport unit 12, the chains 20 are circulated in the direction of arrow G while the leading end portion P1 of each paper sheet P is held by one of the grippers 18, so that the paper sheet P is transported and caused to pass through an opposing position 54 (or a second transfer position) described below. In addition, in the transport unit 12, the paper sheet P that has passed through the opposing position 54 (or the second transfer position) is transported to the fixing unit 16.

Image Forming Unit 14

The image forming unit 14 illustrated in FIG. 1 has a function of forming an image on each paper sheet P. More specifically, the image forming unit 14 includes plural toner image forming units 28 that form toner images by an electrophotographic system and a transfer unit 30 that transfers the toner images formed by the toner image forming units 28 to the paper sheet P.

Toner Image Forming Units 28

The toner image forming units 28 are provided to form toner images of respective colors. In the present exemplary embodiment, four toner image forming units 28 of respective colors, which are yellow (Y), magenta (M), cyan (C), and black (K), are provided. In FIG. 1, the letters Y, M, C, and K represent the respective colors. The toner image forming units 28 of the respective colors have similar structures except for the toners used therein. Therefore, in FIG. 1, only components of the toner image forming unit 28Y, which serves as a representative one of the toner image forming units 28 of the respective colors, are denoted by reference numerals.

Each of the toner image forming units 28 of the respective colors includes a cylindrical photoconductor 32 that rotates and a charging device 34 that charges the photoconductor 32. Each toner image forming unit 28 further includes an exposure unit 36 that irradiates the charged photoconductor 32 with light for exposure to form an electrostatic latent image, and a developing unit 38 that develops the electrostatic latent image into an image formed of a toner layer by using developer containing toner. Each toner image forming unit 28 further includes a cleaner 40 that removes the toner that remains on the surface of the photoconductor 32 after transferring of the toner from the photoconductor 32 to the transfer belt 42.

Transfer Unit 30

The transfer unit 30 illustrated in FIG. 1 has a function of transferring the toner images on the photoconductors 32 of the respective colors onto a transfer belt 42, which serves as an intermediate transfer body, in a superposed manner in a first transfer process, and then transferring the superposed toner images to the paper sheet P in a second transfer process. More specifically, the transfer unit 30 includes the transfer belt 42 that serves as an intermediate transfer body, first transfer rollers 44, the transfer cylinder 46, and a second transfer roller 48 (example of a transfer roller).

The first transfer rollers 44 have a function of transferring the toner images formed on the photoconductors 32 to an outer peripheral surface of the transfer belt 42 at first transfer positions 50 between the photoconductors 32 and the first transfer rollers 44.

The transfer belt 42 has an endless shape (or a loop shape), and is wrapped around the second transfer roller 48 and plural rollers 52 so that the transfer belt 42 is supported by the second transfer roller 48 and the rollers 52 in a predetermined position. When at least one of the rollers 52 is rotated, the transfer belt 42 is circulated in the direction of arrow X and transports the images that have been transferred thereto in the first transfer process to the opposing position 54.

The transfer cylinder 46 has a function of transferring the toner images that have been transferred to the transfer belt 42 to the paper sheet P. The transfer cylinder 46 is disposed at a lower left position with respect to the transfer belt 42 so that the transfer cylinder 46 faces the transfer belt 42. The transfer cylinder 46 has a cylindrical shape with an axis thereof extending in the front-back direction. The transfer cylinder 46 rotates together with sprockets (not illustrated) around which the chains 20 are wrapped. The transfer cylinder 46 has a recessed groove 46A (example of a first groove) for preventing interference with each gripper 18 in an outer peripheral portion thereof, which is an outer portion thereof in the rotational radial direction. When each gripper 18 passes between the transfer cylinder 46 and the second transfer roller 48, the gripper 18 is disposed in the recessed groove 46A.

The second transfer roller 48 opposes the transfer cylinder 46 at the predetermined opposing position 54 with the transfer belt 42 disposed between the second transfer roller 48 and the transfer cylinder 46. More specifically, the second transfer roller 48 is disposed at an upper right position with respect to the transfer cylinder 46.

In the transfer unit 30, each paper sheet P transported by one of the grippers 18 and the chains 20 is nipped between the transfer belt 42 and the transfer cylinder 46 at the opposing position 54, and a second transfer bias is applied between the transfer cylinder 46 and the second transfer roller 48 to generate an electrostatic force that causes the toner images that have been transferred to the outer peripheral surface of the transfer belt 42 to be transferred to the paper sheet P. Thus, the opposing position 54 may also be referred to as a second transfer position at which the tone images are transferred in the second transfer process. The opposing position 54 may also be referred to as an image formation position at which an image is formed on the paper sheet P. Furthermore, the opposing position 54 may also be referred to as a nipping position (or a nipping region) at which the paper sheet P is nipped between the transfer belt 42 (or the second transfer roller 48) and the transfer cylinder 46. Furthermore, the opposing position 54 may also be referred to as a contact position (or a contact region) at which the second transfer roller 48 and the transfer belt 42 are in contact with each other.

Fixing Unit 16

The fixing unit 16 illustrated in FIG. 1 has a function of fixing the image on the paper sheet P to the paper sheet P. More specifically, the fixing unit 16 includes the fixing cylinder 56 and a pressure roller 58. The pressure roller 58 is an example of a pressure unit. In the fixing unit 16, the image that has been transferred to the paper sheet P is fixed to the paper sheet P by heat generated by a heating source (not illustrated) disposed in the pressure roller 58 and pressure applied between the pressure roller 58 and the fixing cylinder 56.

The fixing cylinder 56 has a cylindrical shape with an axis thereof extending in the front-back direction. The fixing cylinder 56 has an outer diameter that is equal to the outer diameter of the transfer cylinder 46 within a predetermined tolerance. The fixing cylinder 56 is disposed to the left of the transfer cylinder 46 and at the same position as the transfer cylinder 46 in the up-down direction within a predetermined tolerance. The fixing cylinder 56 rotates together with sprockets (not illustrated) around which the chains 20 are wrapped. The number of teeth on these sprockets is equal to the number of teeth on the sprockets that rotate together with the transfer cylinder 46. The fixing cylinder 56 has a recessed groove 56A (example of a second groove) for preventing interference with each gripper 18 in an outer peripheral portion thereof, which is an outer portion thereof in the rotational radial direction. In the present exemplary embodiment, the dimensions of each portion of the recessed groove 56A are equal to the dimensions of each portion of the recessed groove 46A in the transfer cylinder 46 within a predetermined tolerance. When each gripper 18 passes between the fixing cylinder 56 and the pressure roller 58, the gripper 18 is disposed in the recessed groove 56A.

In the present exemplary embodiment, a mechanism is provided for separating the pressure roller 58 from the fixing cylinder 56 when the recessed groove 56A in the fixing cylinder 56 passes through a region below the pressure roller 58 and moving the pressure roller 58 toward the fixing cylinder 56 (returning the pressure roller 58 to the original position) when the recessed groove 56A in the fixing cylinder 56 leaves the region below the pressure roller 58. This mechanism may be omitted.

In the fixing unit 16, the paper sheet P transported by one of the grippers 18 and the chains 20 is nipped between the fixing cylinder 56 and the pressure roller 58, so that the image that has been transferred to the paper sheet P is fixed to the paper sheet P. Thus, the position at which the paper sheet P is nipped between the fixing cylinder 56 and the pressure roller 58 may also be referred to as a fixing position at which the image is fixed. This position may also be referred to as a nipping position (or a nipping region) at which the paper sheet P is nipped between the pressure roller 58 and the fixing cylinder 56. Furthermore, this position may also be referred to as a contact position (or a contact region) at which the pressure roller 58 and the fixing cylinder 56 are in contact with each other.

Structure for Reducing Degradation of Image Transferred to Paper Sheet P

The structure of a relevant part of the present exemplary embodiment will now be described.

Figure 4:
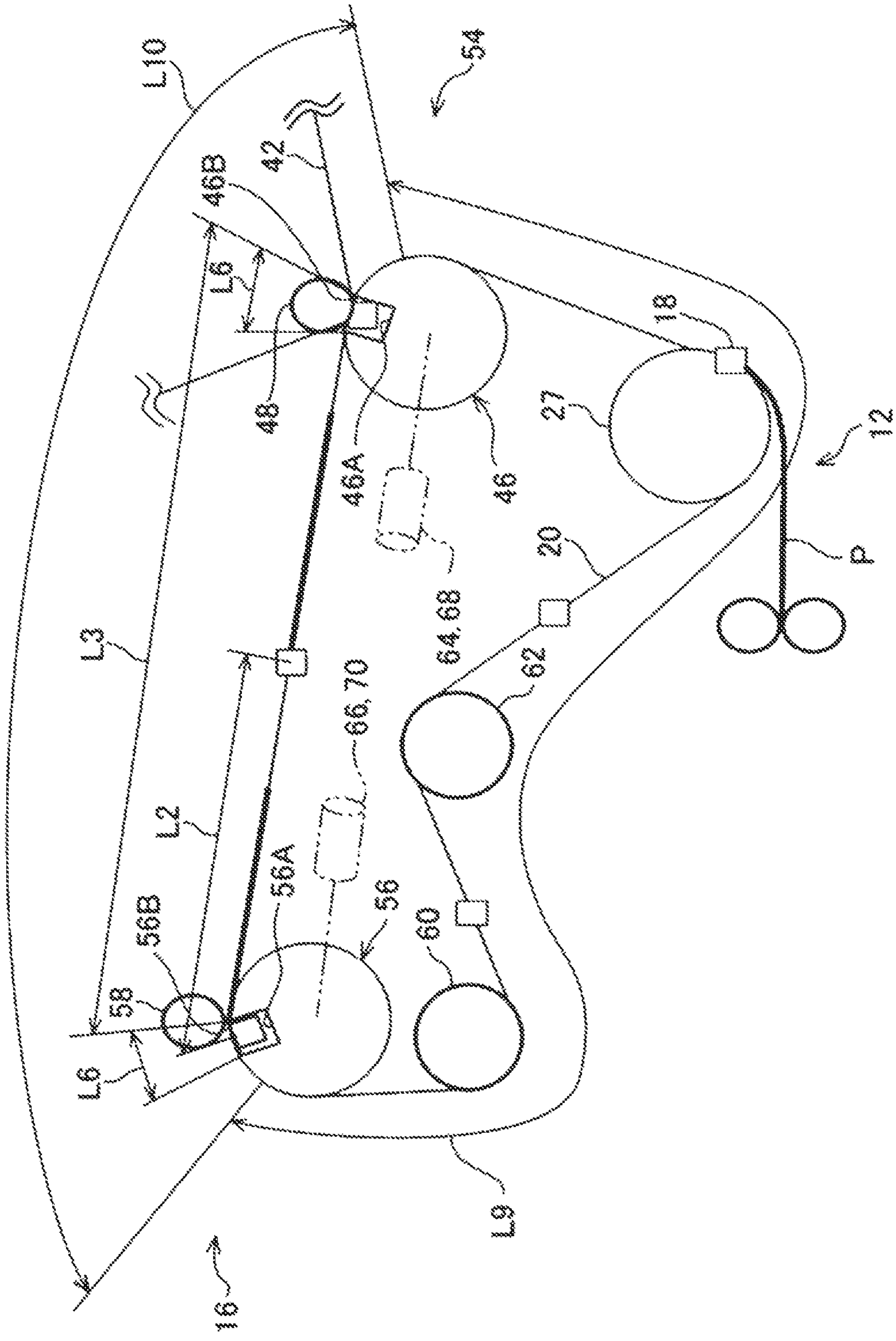
FIG. 4 is an enlarged front view of a part of the image forming apparatus illustrated in FIG. 1.

As illustrated in FIG. 4, the image forming apparatus 10 according to the present exemplary embodiment is configured such that when a rotationally upstream end portion 56B of the recessed groove 56A in the fixing cylinder 56 is in contact with the pressure roller 58, the second transfer roller 48 opposes the recessed groove 46A in the transfer cylinder 46 in the rotational radial direction of the second transfer roller 48 and the transfer cylinder 46. More specifically, when the rotationally upstream end portion 56B of the recessed groove 56A in the fixing cylinder 56 is in contact with the pressure roller 58, the second transfer roller 48 opposes a portion of the transfer cylinder 46 in the rotational radial direction of the second transfer roller 48 and the transfer cylinder 46, the portion extending between rotationally upstream and downstream end portions of the recessed groove 46A in the transfer cylinder 46. Accordingly, in the present exemplary embodiment, parameters described below are set to satisfy the conditions described below.

Assume that L1 is the overall length of each chain 20, L2 is an interval in the length direction of the chain 20 between one of the grippers 18 and another one of the grippers 18 that are adjacent to each other in the length direction of the chain 20, and N is the number of grippers 18. The overall length L1 of the chain 20 is determined by the following Expression a1:

$$L1=L2\times N \quad \text{Expression a1}$$

Assume that L3 is the length of each chain 20 in a region from a rotationally upstream end portion 46B of the recessed groove 46A in the transfer cylinder 46 to the rotationally upstream end portion 56B of the recessed groove 56A in the fixing cylinder 56. In addition, L6 is a circumferential length of the transfer cylinder 46 along the open end of the recessed groove 46A and a circumferential length of the fixing cylinder 56 along the open end of the recessed groove 56A. In addition, n1 is the number of grippers 18 disposed in the region from the rotationally upstream end portion 46B of the recessed groove 46A in the transfer cylinder 46 to the rotationally upstream end portion 56B of the recessed groove 56A in the fixing cylinder 56. More specifically, n1 is the maximum number of grippers 18 disposed in the region from the rotationally upstream end portion 46B of the recessed groove 46A in the transfer cylinder 46 to the rotationally upstream end portion 56B of the recessed groove 56A in the fixing cylinder 56 during circulation of the chain 20.

The above-described parameters are set to satisfy the following Expression a2:

$$L2\times n1-L6<L3<L2\times n1 \qquad \text{Expression a2}$$

In the present exemplary embodiment, a first intermediate shaft portion 60 and a second intermediate shaft portion 62 are further provided. Each chain 20 is wrapped around the first intermediate shaft portion 60 and the second intermediate shaft portion 62 in a region that is rotationally upstream of the transfer cylinder 46 and rotationally downstream of the fixing cylinder 56. The first intermediate shaft portion 60 is an example of an inner intermediate shaft portion. The second intermediate shaft portion 62 is an example an intermediate shaft portion and an outer intermediate shaft portion.

The first intermediate shaft portion 60 and the second intermediate shaft portion 62 are supported rotatably about respective axes extending the front-back direction. The first intermediate shaft portion 60 includes a pair of sprockets around which the pair of chains 20 are wrapped, a shaft member that connects the pair of sprockets in the axial direction, and a flywheel fixed to the shaft member.

Similarly to the first intermediate shaft portion 60, the second intermediate shaft portion 62 includes a pair of sprockets around which the pair of chains 20 are wrapped, a shaft member that connects the pair of sprockets in the axial direction, and a flywheel fixed to the shaft member. In the present exemplary embodiment, the masses of the flywheels, for example, are set so that the moment of inertia of the second intermediate shaft portion 62 is greater than the moment of inertia of the transfer cylinder 46 and the moment of inertia of the fixing cylinder 56.

Assume that L9 is a length of each chain 20 in a region that is rotationally upstream of the transfer cylinder 46 and rotationally downstream of the fixing cylinder 56 and that extends from a circumferential center position of a portion of the fixing cylinder 56 around which the chain 20 is wrapped to a circumferential center position of a portion of the transfer cylinder 46 around which the chain 20 is wrapped via the second intermediate shaft portion 62. In addition, L10 is a length of each chain 20 in a region that is rotationally downstream of the transfer cylinder 46 and rotationally upstream of the fixing cylinder 56 and that extends from the circumferential center position of the portion of the transfer cylinder 46 around which the chain 20 is wrapped to the circumferential center position of the portion of the fixing cylinder 56 around which the chain 20 is wrapped. In this case, the following Expression a3 is satisfied.

$$L9>L10 \qquad \text{Expression a3}$$

In the present exemplary embodiment, the first intermediate shaft portion 60 is disposed below the fixing cylinder 56. Each chain 20 is wrapped around the first intermediate shaft portion 60 such that the first intermediate shaft portion 60 is disposed inside the chain 20. The second intermediate shaft portion 62 is disposed below the fixing cylinder 56, to the right of the first intermediate shaft portion 60, and to the left of the transfer cylinder 46 and the delivery cylinder 27. Each chain 20 is wrapped around the second intermediate shaft portion 62 such that the second intermediate shaft portion 62 is disposed outside the chain 20.

In addition, in the present exemplary embodiment, a first motor 64 that rotates the transfer cylinder 46 and a second motor 66 that rotates the fixing cylinder 56 are provided. The first motor 64 and the second motor 66 are, for example, alternating current (AC) servo motors. Rotation of the first motor 64 is slowed down and transmitted to the transfer cylinder 46 by a speed reducer (not illustrated). Rotation of the second motor 66 is slowed down and transmitted to the fixing cylinder 56 by a speed reducer (not illustrated). The first motor 64 and the speed reducer that slows down the rotation of the first motor 64 and transmits the rotation to the transfer cylinder 46 form a first driving unit 68 that rotates the transfer cylinder 46. The second motor 66 and the speed reducer that slows down the rotation of the second motor 66 and transmits the rotation to the fixing cylinder 56 form a second driving unit 70 that rotates the fixing cylinder 56. In the present exemplary embodiment, the first motor 64 of the first driving unit 68 and the second motor 66 of the second driving unit 70 have the same rated output. In addition, the speed reducer of the first driving unit 68 and the speed reducer of the second driving unit 70 have the same speed reduction ratio.

The rotation of the first motor 64 and the rotation of the second motor 66 are controlled independently of each other. The rotation of the first motor 64 is detected by an encoder (not illustrated). The rotation of the first motor 64 is controlled so that the speed of the rotation detected by the encoder approaches a predetermined speed (number of rotation). Similarly, the rotation of the second motor 66 is detected by an encoder (not illustrated). The rotation of the second motor 66 is controlled so that the speed of the rotation detected by the encoder approaches a predetermined speed (number of rotation).

In the present exemplary embodiment, the ratio of the moment of inertia of the fixing cylinder 56 to the output torque of the second driving unit 70 is set to be greater than the ratio of the moment of inertia of the transfer cylinder 46 to the output torque of the first driving unit 68. More specifically, the moment of inertia of the fixing cylinder 56 is set to be greater than the moment of inertia of the transfer cylinder 46. In other words, the moment of inertia of the transfer cylinder 46 is set to be less than the moment of inertia of the fixing cylinder 56. In the present exemplary embodiment, the mass of the fixing cylinder 56 is greater than the mass of the transfer cylinder 46.

Structure for Suppressing Reduction in Accuracy with which Paper Sheet P is Held with Grippers 18

A structure for suppressing reduction in the accuracy with which the paper sheet P is held with the grippers 18 will now be described as the structure of another relevant part of the present exemplary embodiment.

Figure 5:
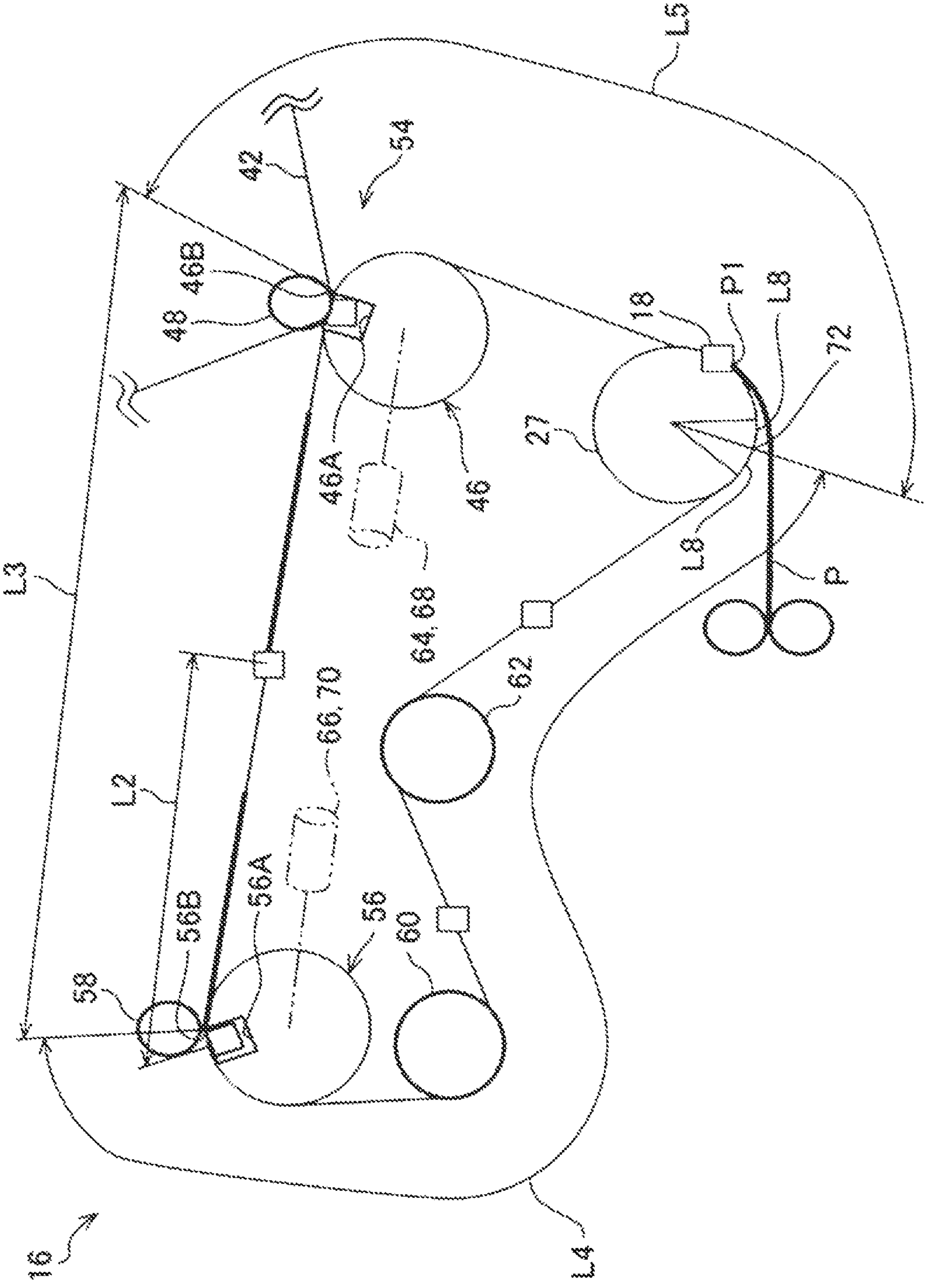
FIG. 5 is another enlarged front view of the part of the image forming apparatus illustrated in FIG. 1.

As illustrated in FIG. 5, the image forming apparatus 10 according to the present exemplary embodiment is configured such that the pressure roller 58 comes into contact with an end portion of the recessed groove 56A in the rotation direction of the fixing cylinder 56 before or after a period from when one of the grippers 18 starts a holding operation for holding the paper sheet P to when the holding operation is completed. More specifically, the pressure roller 58 comes into contact with the rotationally upstream end portion 56B of the recessed groove 56A before or after the period from when one of the grippers 18 starts the holding operation for holding the paper sheet P to when the holding operation is completed. Accordingly, in the present exemplary embodiment, parameters described below are set to satisfy the conditions described below.

Assume that L4 is the length of each chain 20 in a region from the rotationally upstream end portion 56B of the recessed groove 56A in the fixing cylinder 56 to the delivery position 72 at which the paper sheet P is received by one of the grippers 18 on the delivery cylinder 27. In addition, n3 is the number of grippers 18 disposed in the region from the rotationally upstream end portion 56B of the recessed groove 56A in the fixing cylinder 56 to the delivery position 72 at which the paper sheet P is received by one of the grippers 18 on the delivery cylinder 27. More specifically, n3 is the maximum number of grippers 18 disposed in the region from the rotationally upstream end portion 56B of the recessed groove 56A in the fixing cylinder 56 to the delivery position 72 at which the paper sheet P is received by one of the grippers 18 on the delivery cylinder 27 during circulation of the chain 20. In addition, L8 is ½ of the distance by which each gripper 18 moves in a period from when the gripper 18 starts the holding operation for holding the paper sheet P to when the holding operation is completed. Referring to FIG. 3A, the time at which the gripper 18 starts the holding operation for holding the paper sheet P is the time at which the casing 26 and the clips 24 that have been in a closed state open so that the gap between the casing 26 and the clips 24 is largest. Referring to FIG. 3E, the time at which the holding operation for holding the paper sheet P performed by the gripper 18 is completed is the time at which the casing 26 and the clips 24 are closed so that the leading end portion P1 of the paper sheet P is held by the fixed lug portion 26A of the casing 26 and the end portions 24A of the clips 24 of the gripper 18. The delivery position 72 at which the paper sheet P is received by the gripper 18 on the delivery cylinder 27 is the center position of a range over which the gripper 18 moves in the period from when the gripper 18 starts the holding operation for holding the paper sheet P to when the holding operation is completed. As illustrated in FIG. 3C, after the speed of the paper sheet P is reduced to the second transport speed V2, the leading end portion P1 of the paper sheet P enters the space between the end portion 24A of each clip 24 and the end portion 26B of the fixed lug portion 26A of the casing 26 at the delivery position 72. The delivery cylinder 27 rotates by about 40 to 50 degrees while the gripper 18 moves twice the distance L8 in the period from when the gripper 18 starts the holding operation for holding the paper sheet P to when the holding operation is completed.

The above-described parameters are set to satisfy the following Expression b1:

$$L4<L2\times n3-L8 \text{ or } L2\times n3+L8<L4 \qquad \text{Expression b1}$$

Referring to FIG. 5, assume that L5 is the length of each chain 20 in a region from the delivery position 72 at which the paper sheet P is received by one of the grippers 18 on the delivery cylinder 27 to the rotationally upstream end portion 46B of the recessed groove 46A in the transfer cylinder 46. In addition, n5 is the number of grippers 18 disposed in the region from the delivery position 72 at which the paper sheet P is received by one of the grippers 18 on the delivery cylinder 27 to the rotationally upstream end portion 46B of the recessed groove 46A in the transfer cylinder 46. More specifically, n5 is the maximum number of grippers 18 disposed in the region from the delivery position 72 at which the paper sheet P is received by one of the grippers 18 on the delivery cylinder 27 to the rotationally upstream end portion 46B of the recessed groove 46A in the transfer cylinder 46 during circulation of the chain 20.

The above-described parameters are set to satisfy the following Expression b2:

$$L5<L2\times n5-L8 \text{ or } L2\times n5+L8<L5 \qquad \text{Expression b2}$$

Operation of Present Exemplary Embodiment

An operation of the present exemplary embodiment will now be described.

The above-described image forming apparatus 10 according to the present exemplary embodiment is configured such that when the rotationally upstream end portion 56B of the recessed groove 56A in the fixing cylinder 56 is in contact with the pressure roller 58, the second transfer roller 48 opposes the recessed groove 46A in the transfer cylinder 46 in the rotational radial direction of the second transfer roller 48 and the transfer cylinder 46. This is realized by setting the above-described parameters to satisfy L2×n1−L6<L3<L2×n1 (Expression a2). Accordingly, in the present exemplary embodiment, the rotationally upstream end portion 56B of the recessed groove 56A in the fixing cylinder 56 does not come into contact with the pressure roller 58 while transferring is performed on the paper sheet P at the position between the transfer cylinder 46 and the second transfer roller 48. In other words, vibration due to contact between the rotationally upstream end portion 56B of the recessed groove 56A in the fixing cylinder 56 and the pressure roller 58 does not occur while transferring is performed on the paper sheet P at the position between the transfer cylinder 46 and the second transfer roller 48.

In the image forming apparatus 10 according to the present exemplary embodiment, the moment of inertia of the fixing cylinder 56 is set to be greater than the moment of inertia of the transfer cylinder 46, so that the ratio of the moment of inertia of the fixing cylinder 56 to the output torque of the second driving unit 70 is greater than the ratio of the moment of inertia of the transfer cylinder 46 to the output torque of the first driving unit 68.

The rated output of the first motor 64 may be set to be greater than the rated output of the second motor 66 so that the ratio of the moment of inertia of the fixing cylinder 56 to the output torque of the second driving unit 70 is greater than the ratio of the moment of inertia of the transfer cylinder 46 to the output torque of the first driving unit 68.

In addition, in the image forming apparatus 10 according to the present exemplary embodiment, the second intermediate shaft portion 62 around which each chain 20 is wrapped is provided, and the moment of inertia of the second intermediate shaft portion 62 is set to be greater than the moment of inertia of the transfer cylinder 46 and the moment of inertia of the fixing cylinder 56. In addition, in the image forming apparatus 10 according to the present exemplary embodiment, the above-described Expression a3 is satisfied.

The image forming apparatus 10 according to the present exemplary embodiment includes the second intermediate shaft portion 62 in addition to the first intermediate shaft portion 60. The second intermediate shaft portion 62 is disposed below the fixing cylinder 56, to the right of the first intermediate shaft portion 60, and to the left of the transfer cylinder 46 and the delivery cylinder 27. Each chain 20 is wrapped around the second intermediate shaft portion 62 such that the second intermediate shaft portion 62 is disposed outside the chain 20.

In addition, the image forming apparatus 10 according to the present exemplary embodiment is configured such that the pressure roller 58 comes into contact with the rotationally upstream end portion 56B of the recessed groove 56A before or after the period from when one of the grippers 18 starts the holding operation for holding the paper sheet P to when the holding operation is completed. This is realized by setting the above-described parameters to satisfy L4<L2×n3−L8 or L2×n3+L8<L4 (Expression b1). Accordingly, in the present exemplary embodiment, the pressure roller 58 does not come into contact with the rotationally upstream end portion 56B of the recessed groove 56A in the period from when one of the grippers 18 starts the holding operation for holding the paper sheet P to when the holding operation is completed. In other words, vibration due to contact between the rotationally upstream end portion 56B of the recessed groove 56A in the fixing cylinder 56 and the pressure roller 58 does not occur in the period from when one of the grippers 18 starts the holding operation for holding the paper sheet P to when the holding operation is completed.

In addition, in the image forming apparatus 10 according to the present exemplary embodiment, the above-described parameters are set to satisfy L5<L2×n5−L8 or L2×n5+L8<L5 (Expression b2). Accordingly, in the present exemplary embodiment, the rotationally upstream end portion 46B of the recessed groove 46A in the transfer cylinder 46 does not come into contact with the second transfer roller 48 in the period from when one of the grippers 18 starts the holding operation for holding the paper sheet P to when the holding operation is completed. In other words, vibration due to contact between the rotationally upstream end portion 46B of the recessed groove 46A in the transfer cylinder 46 and the second transfer roller 48 does not occur in the period from when one of the grippers 18 starts the holding operation for holding the paper sheet P to when the holding operation is completed.

The above-described structures may be applied in combinations as appropriate. In addition, components of the image forming apparatus 10 may be replaced by other components having similar functions.

Although two driving units, which are the first driving unit 68 and the second driving unit 70, are provided in the above-described example, the present disclosure is not limited to this. For example, the structure may instead be such that only one of the first driving unit 68 and the second driving unit 70 is provided.

In addition, although the moment of inertia of the fixing cylinder 56 is set to be greater than the moment of inertia of the transfer cylinder 46 in the above-described example, the present disclosure is not limited to this. For example, the moment of inertia of the fixing cylinder 56 may be less than the moment of inertia of the transfer cylinder 46. Alternatively, the moment of inertia of the fixing cylinder 56 may be equal to the moment of inertia of the transfer cylinder 46.

In the above-described example, the moment of inertia of the second intermediate shaft portion 62 is set to be greater than the moment of inertia of the transfer cylinder 46 and the moment of inertia of the fixing cylinder 56, and the above-described Expression a3 is satisfied. However, the present disclosure is not limited to this. Whether to set to the moment of inertia of the second intermediate shaft portion 62 to be greater than the moment of inertia of the transfer cylinder 46 and the moment of inertia of the fixing cylinder 56 and whether to satisfy the above-described Expression a3 may be determined as appropriate in consideration of the level of variation in the speed of the transfer cylinder 46. The second intermediate shaft portion 62 may also be omitted.

Although an exemplary embodiment of the present disclosure is described above, the present disclosure is not limited to the above description, and various other modifications are, of course, possible without departing from the spirit of the present disclosure.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An image forming apparatus comprising:

a fixing cylinder that is rotatably supported, that has a groove formed in an outer portion thereof in a rotational radial direction thereof, and that causes an image transferred to a recording medium to be fixed to the recording medium when the recording medium passes along an outer surface of the fixing cylinder in the rotational radial direction;

a delivery cylinder that is rotatably supported;

a circulating member that is loop-shaped and wrapped at least around the fixing cylinder and the delivery cylinder;

a plurality of holding members configured to hold the recording medium when the recording medium passes around the delivery cylinder toward the fixing cylinder, the holding members being supported by the circulating member such that the holding members are arranged in a length direction of the circulating member with predetermined intervals therebetween, each holding member being disposed in the groove when the holding member passes along the outer portion of the fixing cylinder;

a pressure unit that is rotatably supported and that causes the recording medium to pass between the pressure unit and the fixing cylinder while a pressure is applied between the pressure unit and the fixing cylinder, the pressure unit coming into contact with the fixing cylinder when none of the plurality of holding members is performing a holding operation, wherein a holding operation occurs during a period from when one of the plurality of holding members begins to close until the holding member finishes closing;

a transfer cylinder that is rotatably supported, that has a first groove formed in an outer portion thereof in a rotational radial direction thereof, and that causes the image to be transferred to the recording medium when the recording medium passes along an outer surface of the transfer cylinder in the rotational radial direction;

a transfer roller that is rotatably supported and disposed at a location close to the transfer cylinder; and a first motor that rotates the transfer cylinder about a first axis; and a second motor that rotates the fixing cylinder about a second axis, wherein the groove in the fixing cylinder is a second groove, wherein the circulating member is wrapped at least around the transfer cylinder, the fixing cylinder, and the delivery cylinder, wherein each holding member is disposed in the first groove when the holding member passes along the outer portion of the transfer cylinder, wherein the transfer roller opposes the first groove when the pressure unit comes into contact with a rotationally upstream end portion of the second groove in the fixing cylinder, and wherein a moment of inertia of the transfer cylinder about the first axis is set to be less than a moment of inertia of the fixing cylinder about the second axis.

2. The image forming apparatus according to claim 1, wherein a rated output of the first motor is set to be greater than a rated output of the second motor.

3. The image forming apparatus according to claim 1, further comprising:

an intermediate shaft portion that is rotatably supported about a first axis and around which the circulating member is wrapped at a location that is rotationally upstream of the transfer cylinder and rotationally downstream of the fixing cylinder, wherein the transfer cylinder is rotatably supported about a second axis and the fixing cylinder is rotatably supported about a third axis, wherein a moment of inertia of the intermediate shaft portion about the first axis is set to be greater than a moment of inertia of the transfer cylinder about the second axis and a moment of inertia of the fixing cylinder about the third axis, and wherein Expression 4 is satisfied:

$$L9>L10 \quad \text{Expression 4}$$

where L9 is a length of the circulating member in a region that is rotationally upstream of the transfer cylinder and rotationally downstream of the fixing cylinder and that extends from a circumferential center position of a portion of the fixing cylinder around which the circulating member is wrapped to a circumferential center position of a portion of the transfer cylinder around which the circulating member is wrapped via the intermediate shaft portion, and L10 is a length of the circulating member in a region that is rotationally downstream of the transfer cylinder and rotationally upstream of the fixing cylinder and that extends from the circumferential center position of the portion of the transfer cylinder around which the circulating member is wrapped to the circumferential center position of the portion of the fixing cylinder around which the circulating member is wrapped.

4. The image forming apparatus according to claim 1, further comprising:

an inner intermediate shaft portion that is rotatably supported and around which the circulating member is wrapped in a region between the transfer cylinder and the fixing cylinder and rotationally downstream of the fixing cylinder such that the inner intermediate shaft portion is disposed inside the circulating member; and an outer intermediate shaft portion that is rotatably supported and around which the circulating member is wrapped in the region between the transfer cylinder and the fixing cylinder and rotationally downstream of the fixing cylinder such that the outer intermediate shaft portion is disposed outside the circulating member.

5. An image forming apparatus comprising:

a fixing cylinder that is rotatably supported, that has a groove formed in an outer portion thereof in a rotational radial direction thereof, and that causes an image transferred to a recording medium to be fixed to the recording medium when the recording medium passes along an outer surface of the fixing cylinder in the rotational radial direction;

a delivery cylinder that is rotatably supported;

a circulating member that is loop-shaped and wrapped at least around the fixing cylinder and the delivery cylinder;

a plurality of holding members configured to hold the recording medium when the recording medium passes around the delivery cylinder toward the fixing cylinder, the holding members being supported by the circulating member such that the holding members are arranged in a length direction of the circulating member with predetermined intervals therebetween, each holding member being disposed in the groove when the holding member passes along the outer portion of the fixing cylinder; and a pressure unit that is rotatably supported and that causes the recording medium to pass between the pressure unit and the fixing cylinder while a pressure is applied between the pressure unit and the fixing cylinder, wherein Expression 1 is satisfied:

$$L2\times n3-L8\geq L4$$

where L2 is an interval in the length direction of the circulating member between one of the holding members and another one of the holding members that are adjacent to each other in the length direction of the circulating member, L4 is a length of the circulating member in a region extending in a direction of travel of the circulating member from a rotationally upstream end portion of the groove in the fixing cylinder when the upstream end portion of the groove is in contact with the pressure unit to a position at which the recording medium is delivered to one of the holding members on the delivery cylinder, n3 is number of the holding members disposed in the region from the rotationally upstream end portion of the groove in the fixing cylinder to the position at which the recording medium is delivered to one of the holding members on the delivery cylinder, and L8 is ½ of a distance by which each holding member moves in a period from when the holding member starts a holding operation for holding the recording medium to when the holding operation is complete to hold the recording medium.

6. The image forming apparatus according to claim 5, further comprising:

a transfer cylinder that is rotatably supported, that has a first groove formed in an outer portion thereof in a rotational radial direction thereof, and that causes the image to be transferred to the recording medium when the recording medium passes along an outer surface of the transfer cylinder in the rotational radial direction, wherein the circulating member is wrapped at least around the transfer cylinder, the fixing cylinder, and the delivery cylinder, wherein each holding member is disposed in the first groove when the holding member passes along the outer portion of the transfer cylinder, and wherein the groove in the fixing cylinder is a second groove, and wherein Expression 3 is satisfied:

$$L2\times n1-L6<L3<L2\times n1 \quad \text{Expression 3}$$

where n1 is number of the holding members disposed along the circulating member from the rotationally upstream end portion of the first groove in the transfer cylinder to the rotationally upstream end portion of the second groove in the fixing cylinder in a direction transverse to the rotational radial direction and in a conveyance direction of the sheet, L3 is the length of the circulating member in a region extending in a direction of travel of the circulating member from a rotationally upstream end portion of the first groove in the transfer cylinder to the rotationally upstream end portion of the groove in the fixing cylinder; and L6 is a circumferential length of the transfer cylinder along an open end of the first groove and a circumferential length of the fixing cylinder along an open end of the second groove.

7. The image forming apparatus according to claim 6, further comprising:

a first motor that rotates the transfer cylinder about a first axis; and a second motor that rotates the fixing cylinder about a second axis, wherein a moment of inertia of the transfer cylinder about the first axis is set to be less than a moment of inertia of the fixing cylinder about the second axis.

8. The image forming apparatus according to claim 7, wherein a rated output of the first motor is set to be greater than a rated output of the second motor.

9. The image forming apparatus according to claim 6, further comprising:

a first motor that rotates the transfer cylinder; and a second motor that rotates the fixing cylinder, wherein a rated output of the first motor is set to be greater than a rated output of the second motor.

10. The image forming apparatus according to claim 6, further comprising:

an intermediate shaft portion that is rotatably supported about a first axis and around which the circulating member is wrapped at a location that is rotationally upstream of the transfer cylinder and rotationally downstream of the fixing cylinder, wherein the transfer cylinder is rotatably supported about a second axis and the fixing cylinder is rotatably supported about a third axis, wherein a moment of inertia of the intermediate shaft portion about the first axis is set to be greater than a moment of inertia of the transfer cylinder about the second axis and a moment of inertia of the fixing cylinder about the third axis, and wherein Expression 4 is satisfied:

$$L9>L10 \quad \text{Expression 4}$$

where L9 is a length of the circulating member in a region that is rotationally upstream of the transfer cylinder and rotationally downstream of the fixing cylinder and that extends from a circumferential center position of a portion of the fixing cylinder around which the circulating member is wrapped to a circumferential center position of a portion of the transfer cylinder around which the circulating member is wrapped via the intermediate shaft portion, and L10 is a length of the circulating member in a region that is rotationally downstream of the transfer cylinder and rotationally upstream of the fixing cylinder and that extends from the circumferential center position of the portion of the transfer cylinder around which the circulating member is wrapped to the circumferential center position of the portion of the fixing cylinder around which the circulating member is wrapped.

11. The image forming apparatus according to claim 5, further comprising:

a transfer cylinder that is rotatably supported, that has a first groove formed in an outer portion thereof in a rotational radial direction thereof, and that causes the image to be transferred to the recording medium when the recording medium passes along an outer surface of the transfer cylinder in the rotational radial direction;

a first motor that rotates the transfer cylinder about a first axis; and a second motor that rotates the fixing cylinder about a second axis, wherein a moment of inertia of the transfer cylinder about the first axis is set to be less than a moment of inertia of the fixing cylinder about the second axis, wherein the circulating member is wrapped at least around the transfer cylinder, the fixing cylinder, and the delivery cylinder, wherein each holding member is disposed in the first groove when the holding member passes along the outer portion of the transfer cylinder.

12. The image forming apparatus according to claim 11, wherein a rated output of the first motor is set to be greater than a rated output of the second motor.

13. The image forming apparatus according to claim 11, further comprising:

an intermediate shaft portion that is rotatably supported about a first axis and around which the circulating member is wrapped at a location that is rotationally upstream of the transfer cylinder and rotationally downstream of the fixing cylinder, wherein the transfer cylinder is rotatably supported about a second axis and the fixing cylinder is rotatably supported about a third axis, wherein a moment of inertia of the intermediate shaft portion about the first axis is set to be greater than the moment of inertia of the transfer cylinder about the second axis and the moment of inertia of the fixing cylinder about the third axis, and wherein Expression 4 is satisfied:

$$L9>L10 \quad \text{Expression 4}$$

where L9 is a length of the circulating member in a region that is rotationally upstream of the transfer cylinder and rotationally downstream of the fixing cylinder and that extends from a circumferential center position of a portion of the fixing cylinder around which the circulating member is wrapped to a circumferential center position of a portion of the transfer cylinder around which the circulating member is wrapped via the intermediate shaft portion, and L10 is a length of the circulating member in a region that is rotationally downstream of the transfer cylinder and rotationally upstream of the fixing cylinder and that extends from the circumferential center position of the portion of the transfer cylinder around which the circulating member is wrapped to the circumferential center position of the portion of the fixing cylinder around which the circulating member is wrapped.

14. The image forming apparatus according to claim 5, further comprising:

a transfer cylinder that is rotatably supported, that has a first groove formed in an outer portion thereof in a rotational radial direction thereof, and that causes the image to be transferred to the recording medium when the recording medium passes along an outer surface of the transfer cylinder in the rotational radial direction;

a first motor that rotates the transfer cylinder; and a second motor that rotates the fixing cylinder, wherein a rated output of the first motor is set to be greater than a rated output of the second motor, wherein the circulating member is wrapped at least around the transfer cylinder, the fixing cylinder, and the delivery cylinder, wherein each holding member is disposed in the first groove when the holding member passes along the outer portion of the transfer cylinder.

15. The image forming apparatus according to claim 5, further comprising:

a transfer cylinder that is rotatably supported, that has a first groove formed in an outer portion thereof in a rotational radial direction thereof, and that causes the image to be transferred to the recording medium when the recording medium passes along an outer surface of the transfer cylinder in the rotational radial direction; and an intermediate shaft portion that is rotatably supported about a first axis and around which the circulating member is wrapped at a location that is rotationally upstream of the transfer cylinder and rotationally downstream of the fixing cylinder, wherein the transfer cylinder is rotatably supported about a second axis and the fixing cylinder is rotatably supported about a third axis, wherein a moment of inertia of the intermediate shaft portion about the first axis is set to be greater than a moment of inertia of the transfer cylinder about the second axis and a moment of inertia of the fixing cylinder about the third axis, and wherein Expression 4 is satisfied:

$$L9 > L10 \qquad \text{Expression 4}$$

where L9 is a length of the circulating member in a region that is rotationally upstream of the transfer cylinder and rotationally downstream of the fixing cylinder and that extends from a circumferential center position of a portion of the fixing cylinder around which the circulating member is wrapped to a circumferential center position of a portion of the transfer cylinder around which the circulating member is wrapped via the intermediate shaft portion, and L10 is a length of the circulating member in a region that is rotationally downstream of the transfer cylinder and rotationally upstream of the fixing cylinder and that extends from the circumferential center position of the portion of the transfer cylinder around which the circulating member is wrapped to the circumferential center position of the portion of the fixing cylinder around which the circulating member is wrapped, wherein the circulating member is wrapped at least around the transfer cylinder, the fixing cylinder, and the delivery cylinder, wherein each holding member is disposed in the first groove when the holding member passes along the outer portion of the transfer cylinder.

* * * * *